(12) United States Patent
Lin

(10) Patent No.: US 8,007,001 B2
(45) Date of Patent: Aug. 30, 2011

(54) AUXILIARY INFLATABLE BELT DEVICE AND AUXILIARY SUPPORTING BELT DEVICE

(76) Inventor: Pi-Fen Lin, Keelung (TW)

( * ) Notice: Subject to any disclaimer, the term of this patent is extended or adjusted under 35 U.S.C. 154(b) by 19 days.

(21) Appl. No.: 12/546,129

(22) Filed: Aug. 24, 2009

(65) Prior Publication Data

US 2011/0042925 A1 Feb. 24, 2011

(51) Int. Cl.
*B60R 21/18* (2006.01)
(52) U.S. Cl. ....................................................... 280/733
(58) Field of Classification Search .................. 280/733, 280/730.1
See application file for complete search history.

(56) References Cited

U.S. PATENT DOCUMENTS

| | | | | |
|---|---|---|---|---|
| 3,510,150 A | * | 5/1970 | Wilfert | 280/733 |
| 3,682,498 A | * | 8/1972 | Rutzki | 280/733 |
| 3,841,654 A | * | 10/1974 | Lewis | 280/733 |
| 3,865,398 A | * | 2/1975 | Woll | 280/733 |
| 6,237,945 B1 | * | 5/2001 | Aboud et al. | 280/733 |
| 6,505,854 B1 | * | 1/2003 | Sands et al. | 280/733 |
| 6,857,136 B1 | * | 2/2005 | Bradley et al. | 2/468 |
| 7,607,687 B2 | * | 10/2009 | Clute et al. | 280/733 |
| 2007/0102909 A1 | * | 5/2007 | Nezaki et al. | 280/733 |
| 2009/0033077 A1 | * | 2/2009 | Yamataki | 280/733 |
| 2010/0115737 A1 | * | 5/2010 | Foubert | 24/164 |
| 2010/0164207 A1 | * | 7/2010 | Sekizuka et al. | 280/733 |

* cited by examiner

*Primary Examiner* — Faye M. Fleming
(74) *Attorney, Agent, or Firm* — Kile Goekjian Reed & McManus PLLC

(57) ABSTRACT

An auxiliary inflatable belt device is provided on a seat and includes an inflatable belt body, an inflating device and a fixing device. The interior of the inflatable belt device is formed with an air chamber and provided with at least one inflating port. The inflating device is communicated with the inflating port of the inflatable belt body. The fixing device is connected to the inflatable belt body. After the inflatable belt body is inflated completely, it forms a cubic body for allowing the body and head of a user to rest thereon and supporting the person who sleeps on the seat. Thus, the sleep quality can be enhanced. The present invention further provides an auxiliary supporting belt device.

15 Claims, 5 Drawing Sheets

AUXILIARY INFLATABLE BELT DEVICE AND AUXILIARY SUPPORTING BELT DEVICE

BACKGROUND OF THE INVENTION

1. Field of the Invention

The present invention relates to an auxiliary inflatable belt device and an auxiliary supporting belt device, and in particular, to an auxiliary inflatable belt device and an auxiliary supporting belt device provided on a seat for supporting a person who sleeps on the seat.

2. Description of Related Art

Most people like to take a nap when they sit on a seat of a long-distance public transportation (such as car, airplane, boat or the like). However, when the speed or the traveling direction of the public transportation is changed, the head or the body of the person sitting on the seat may swing easily. As a result, it is not easy for the person sitting on the seat to sleep well. Even, the person may feel his/her neck stiff or hurt after waking up.

In order to overcome the above problems, the present Inventor proposes a novel and reasonable structure based on his delicate researches and expert experiences.

SUMMARY OF THE INVENTION

The objective of the present invention is to provide an auxiliary inflatable belt device and an auxiliary supporting belt device for supporting a person sitting on the seat, thereby increasing his/her sleep quality.

The present invention provides an auxiliary inflatable belt device provided on a seat, which includes an inflatable belt body formed with an air chamber in its interior, a surface of the inflatable belt body being provided with at least one inflating port; an inflating device communicating with the inflating port of the inflatable belt body, the inflatable belt body forming a cubic body after being inflated completely; and a fixing device connected to the inflatable belt body.

The present invention has advantageous features as follows. The auxiliary inflatable belt device is provided on a seat. After being inflated completely, the inflatable belt body forms a cubic body for allowing the body and head of a user to rest thereon. Thus, one who sleeps on the seat can be supported well without swinging, so that the sleep quality can be enhanced.

The auxiliary inflatable belt device can be used to cooperate with a safety belt originally provided on a seat of a public transportation to secure and cushion the user. If a traffic accident happens, the auxiliary inflatable belt device of the present invention also protects the user.

The present invention further provides an auxiliary supporting belt device for allowing the body and head of the user to rest thereon and supporting the person who sleeps on the seat.

In order to further understand the characteristics and technical contents of the present invention, a description relating thereto will be made with reference to the accompanying drawings. However, the drawings are illustrative only but not used to limit the present invention.

DETAILED DESCRIPTION OF THE PREFERRED EMBODIMENTS

Figure 1:
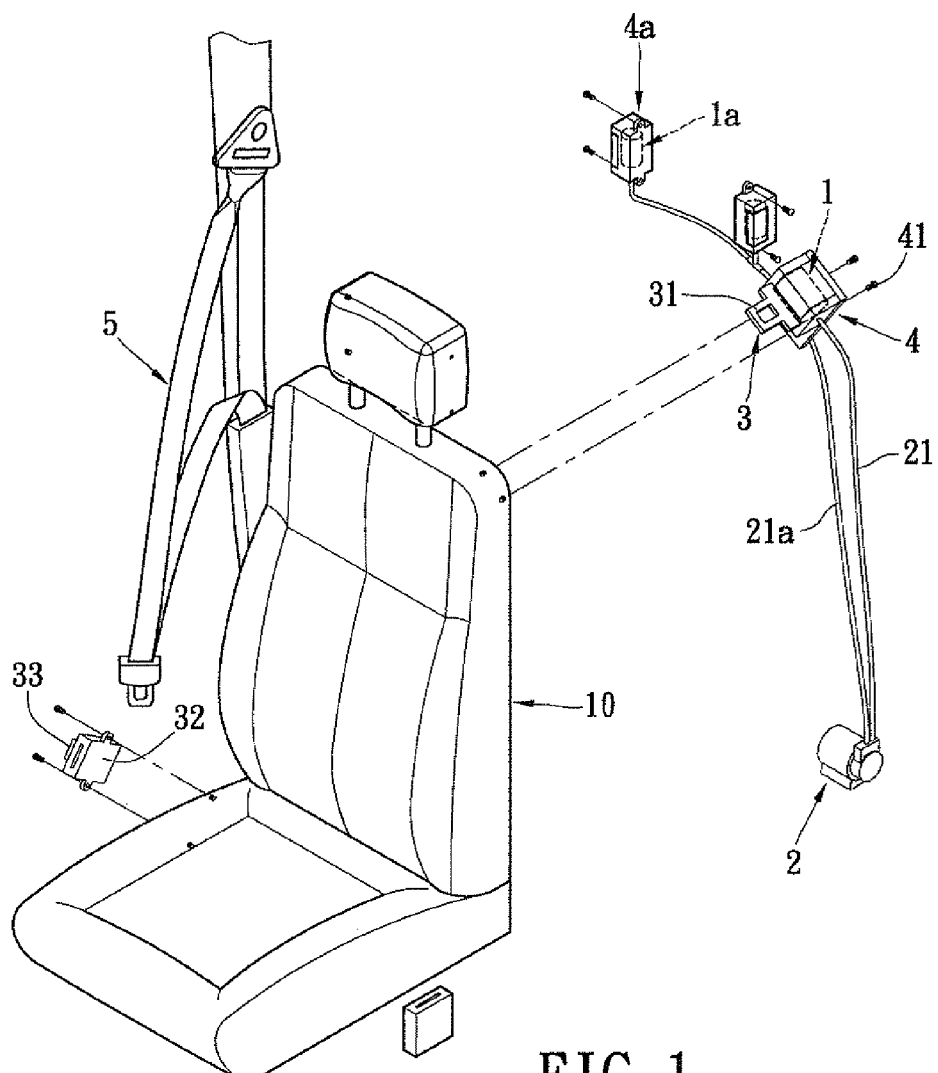
FIG. 1 is an exploded perspective view showing the auxiliary inflatable belt device according to the first embodiment of the present invention.

Please refer to FIGS. 1 to 5. The present invention provides an auxiliary inflatable belt device provided on a seat of public transportation such as a car, airplane, boat or even a common seat. The range to which the present invention can be applied is not limited to the above. The form and number of the auxiliary inflatable belt device are not limited thereto but can be changed according to practical demands.

The auxiliary inflatable belt device can be detachably provided on the seat or built in the seat. The auxiliary inflatable belt device includes an inflatable belt body 1, an inflating device 2 and a fixing device 3. The inflatable belt body 1 is made of flexible materials. The form and size of the inflatable belt body 1 are not limited. The inflatable belt body 1 can be formed into a linear, curved, block-like shape or other suitable shape. The profile of the inflatable belt body 1 can be changed properly according to its position. The inflatable belt body 1 is a hollow body. The interior of the inflatable belt body 1 is formed with an air chamber 11. Alternatively, a plurality of air chambers 11 can be provided and they are communicated with each other. The air chamber 11 is insulated from the exterior environment. The surface of the inflatable belt body 1 is provided with at least one inflating port 12 (FIG. 1A). The inflating port 12 is in communication with the air chamber 11 and the exterior environment, so that the air from the exterior environment can pass through the inflating port 12 into the air chamber 11, thereby filling the air into the inflatable belt body 1.

Figure 1A:
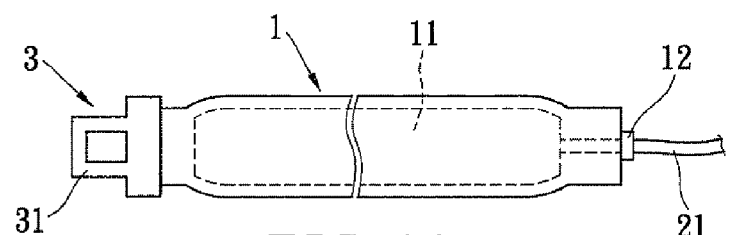
FIG. 1A is a schematic view showing the inflatable belt body of the present invention.
Figure 2:
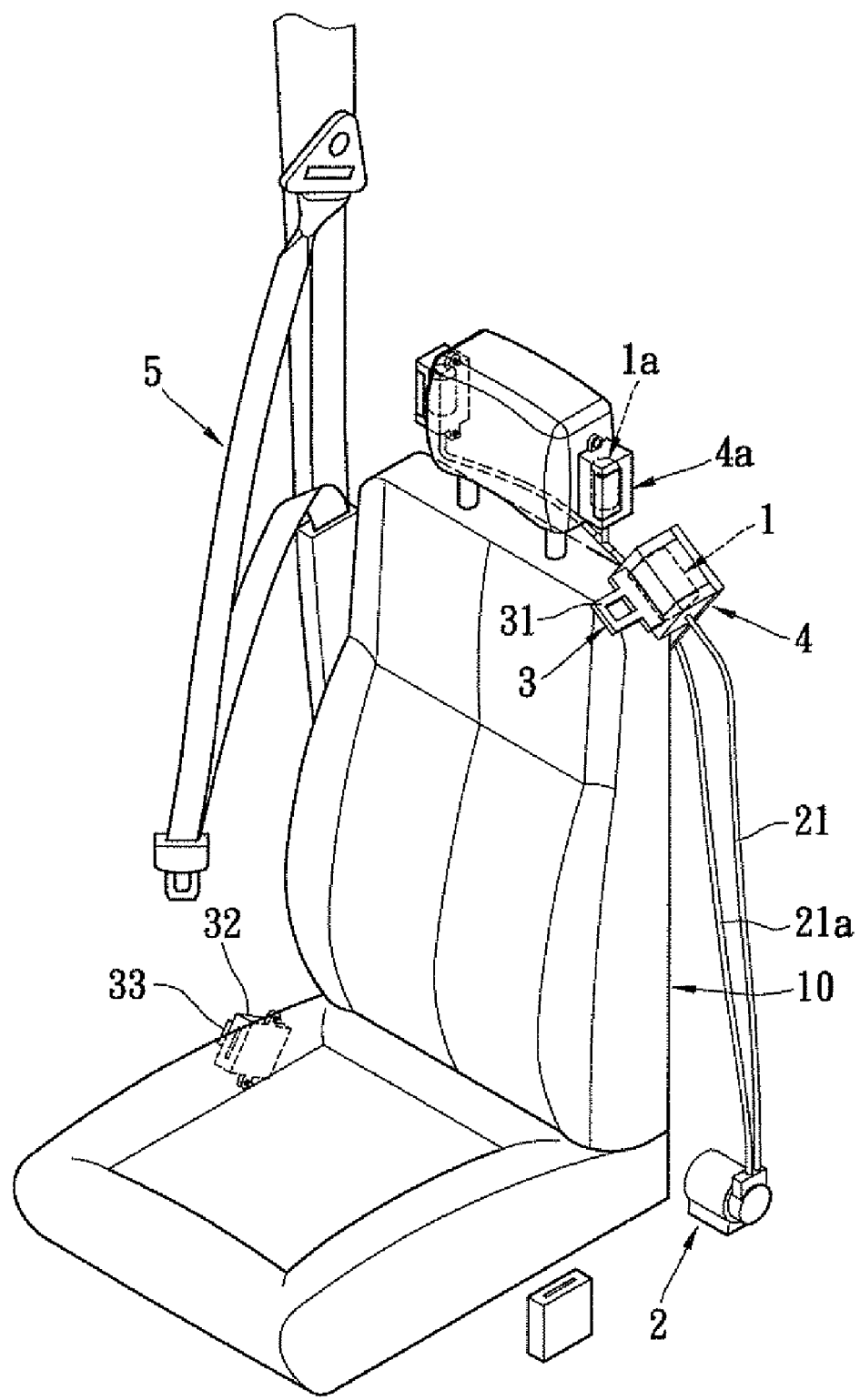
FIG. 2 is an assembled perspective view showing the auxiliary inflatable belt device according to the first embodiment of the present invention.
Figure 3:
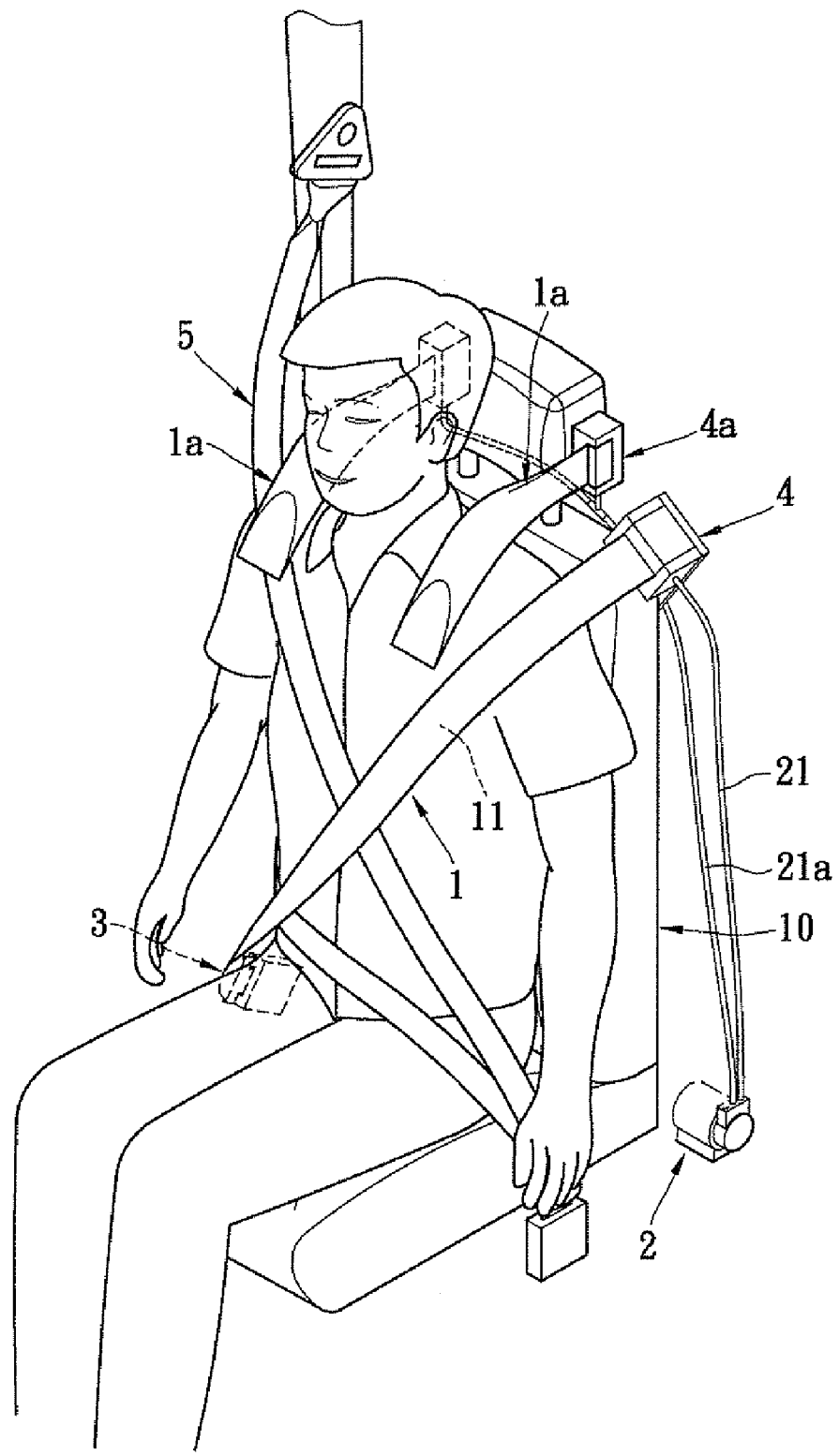
FIG. 3 is a schematic view (I) showing the operating state of the auxiliary inflatable belt device according to the first embodiment of the present invention.
Figure 4:
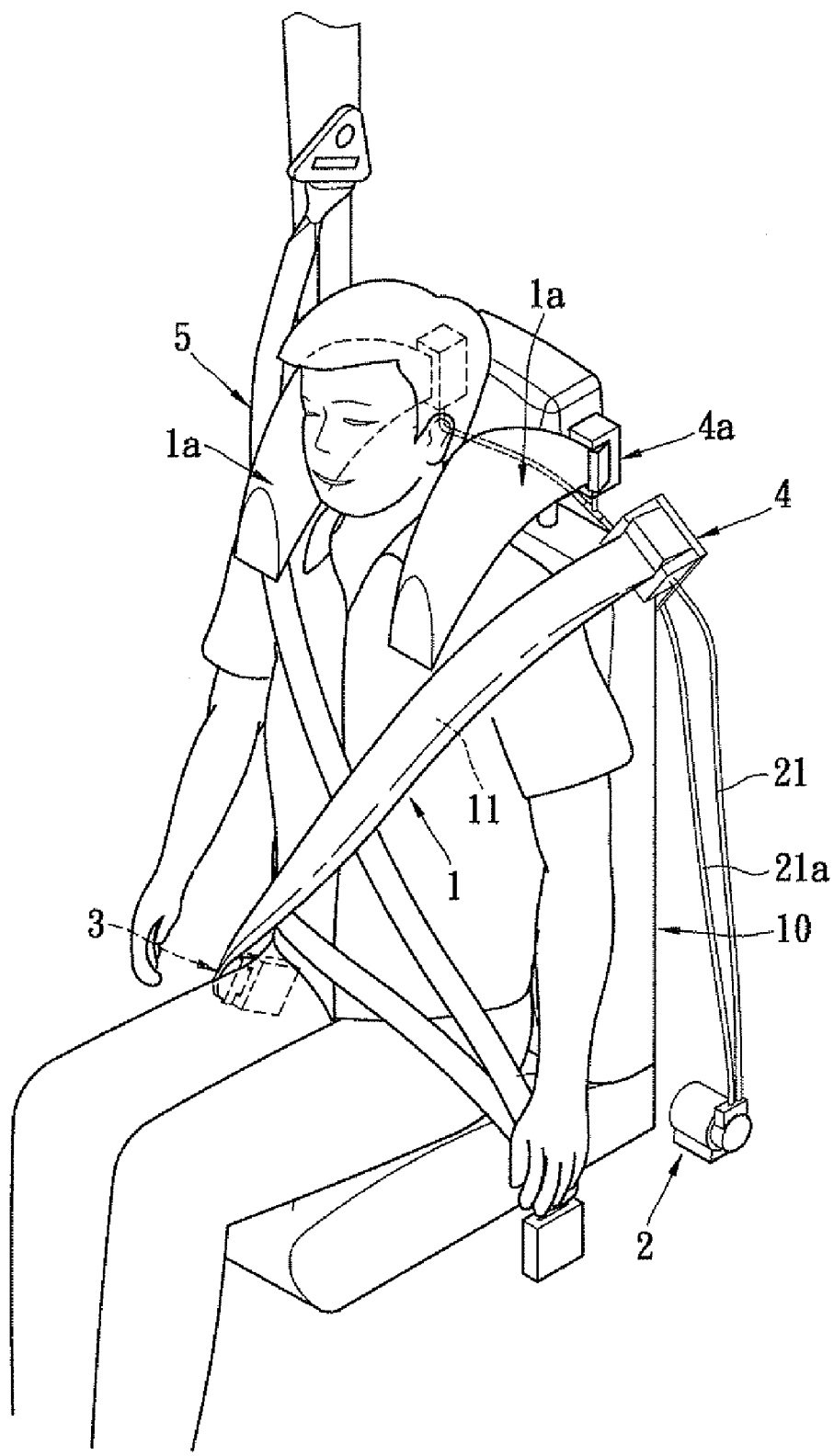
FIG. 4 is a schematic view (II) showing the operating state of the auxiliary inflatable belt device according to the first embodiment of the present invention.

In the first embodiment of the present invention, the auxiliary inflatable belt device is detachably provided on the seat 10 (FIGS. 1 and 2). The inflatable belt body 1 and the fixing device 3 are provided on a base 4, so that the base 4 can be detachably assembled with the seat 10 by means of screws 41. The base 4 is located at an upper position on one side of the seat 10. When the inflatable belt body 1 is not inflated, it can be wound or folded to be received in the base 4. After the inflatable belt body 1 extends outside the base 4 and is inflated completely, it forms a 3-dimensional body for supporting the person who sleeps on the seat 10. When the inflatable belt body 1 is inflated to extend outside the base 4, it secures the body or head of the user in an inclined, horizontal or vertical orientation.

Figure 5:
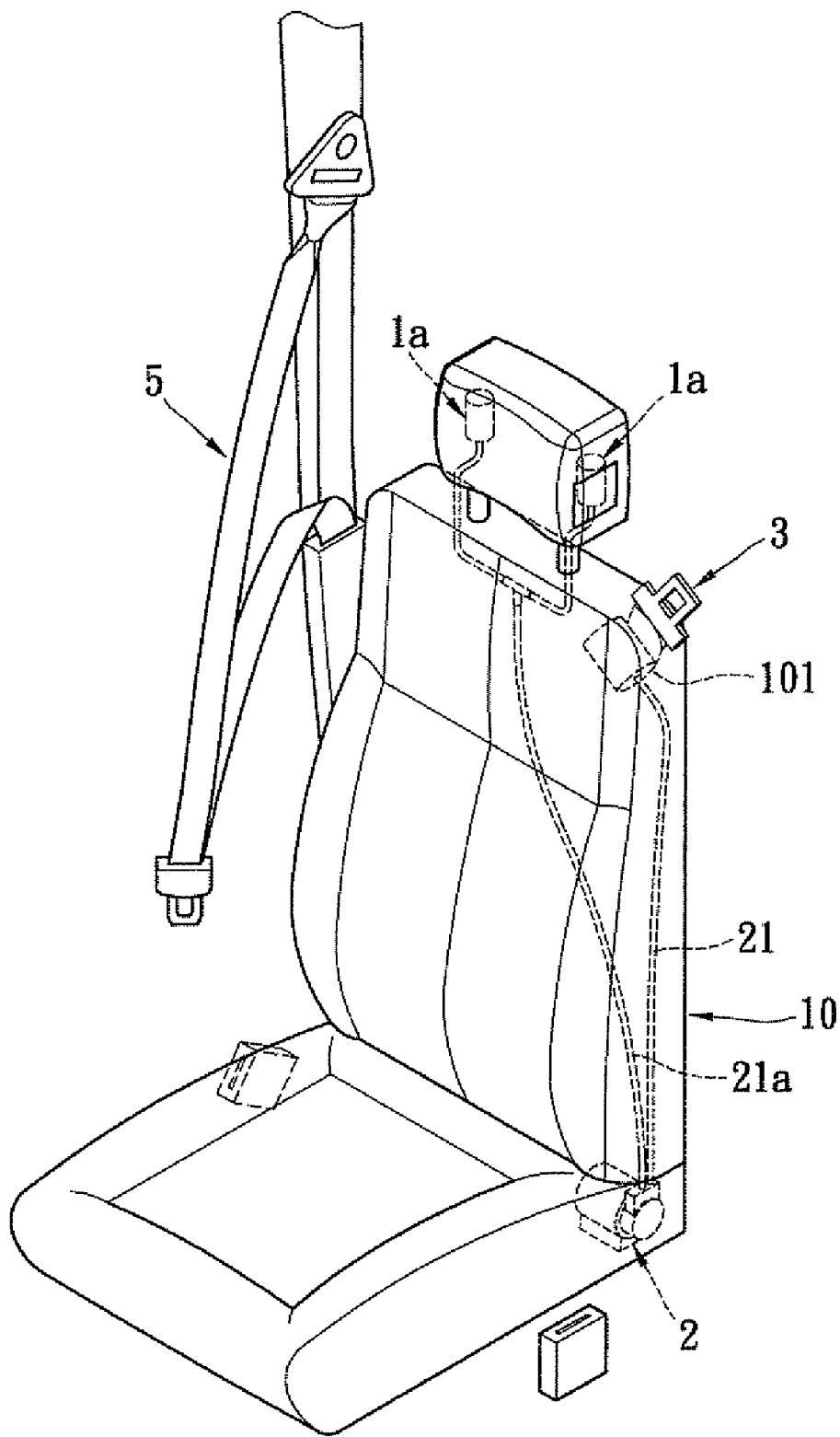
FIG. 5 is an assembled perspective view showing the auxiliary inflatable belt device according to the second embodiment of the present invention.

In the second embodiment of the present invention, the auxiliary inflatable belt device is built in the seat 10 (FIG. 5). The inflatable belt body 1 can be provided in an accommodating space 101 inside the seat 10. The accommodating space 101 is located at an upper position on one side of the seat 10. When the inflatable belt body 1 is not inflated, it is wound or folded to be received in the accommodating space 101.

The inflating device 2 is a manual inflating device or an automatic inflating device. In the present embodiment, the inflating device 2 is an automatic inflating device, which is exemplified by an electric pump. The inflating device 2 is provided on one side of the seat 10. The inflating device 2 is connected to the inflating port 12 of the inflatable belt body 1 by means of a connecting pipe 21. The air from the external environment can be delivered into the air chamber 11 of the inflatable belt body 1 by means of the inflating device 2 and the connecting pipe 21. After the inflatable belt body 21 extends outside the seat 10 (FIG. 3) and is inflated completely (FIG. 4), it form a cubic body.

The maximum amount of air within the inflatable belt body 1 can be adjusted according to the dimensions of the user, thereby increasing the fitness and comfortableness of the inflatable belt body 1 in use. The user can manually control the inflating device 2 or utilize a sensor to automatically detect the operation of the inflating device 2. In this way, the maximum amount of air within the inflating body 1 can be adjusted properly.

In another embodiment of the present invention, the inflating device 2 is a manual inflating device, which is exemplified by an inflating ball (not shown). The inflating ball is provided outside the seat 10 and is in communication with the inflating port 12 of the inflatable belt body 1. The air from the external environment can be delivered into the air chamber 11 of the inflatable belt body 1 by means of pressing the inflating ball. After the inflatable belt body 1 is inflated completely, it forms a cubic body for supporting the person who sleeps on the seat 10.

The fixing device 3 comprises a first fastener 31 and a second fastener 32. The first fastener 31 is fixed to one end of the inflatable belt body 1 away from the inflating port 12. The second fastener 32 is fixed to a lower position on the other side of the seat 10. In the present embodiment, the first fastener 31 is a male fastener, while the second fastener 32 is a female fastener corresponding to the first fastener 31. The second fastener 32 is provided with a release button 33, whereby the first fastener 31 can be selectively inserted into the second fastener 32. The inflatable belt body 1 can surround the shoulder, chest, neck and/or face of the user. Then, the first fastener 31 and the second fastener 32 on one end of the inflatable belt body 1 can be connected to each other, so that the inflatable belt body 1 can be secured to the user firmly. The user can press the release button 33 to separate the first fastener 31 and the second fastener 32. However, the form of the fixing device 3 of the present invention is not limited, and can be replaced by other equivalent fixing devices such as Velcro or ropes.

In another embodiment of the present invention, a plurality of inflatable belt bodies 1 can be provided. The plurality of inflatable belt bodies 1 can be connected together or used individually. The plurality of inflatable belt bodies 1 share a common inflating device 2.

Further, as shown in FIGS. 1 to 4, the auxiliary inflatable belt device of the present invention may not have a fixing device. At an upper end of the seat 10, two auxiliary inflatable belt devices are provided. The inflatable belt bodies 1a of the two auxiliary inflatable belt devices can be provided on a base 4a, thereby combining two bases 4a with the seat 10 in a detachable maimer. Alternatively, the inflatable belt bodies 1a of the two auxiliary inflatable belt devices can be built in the seat 10 (FIG. 5). The two inflatable belt bodies 1a are connected to the inflating device 2 by means of a connecting pipe 21a. The two inflatable belt bodies 1a can surround the shoulder of the user. After the inflatable belt bodies 1a of the two auxiliary inflatable belt devices are inflated completely, they can support the person who sleeps on the seat 10.

The auxiliary inflatable belt device of the present invention can be provided on the seat 10. After the inflatable belt body 1 is inflated completely, it forms a cubic body for allowing the body, head or other portion of the user to rest thereon and supporting the person who sleeps on the seat 10 without swinging. Thus, the sleep quality can be enhanced and the user will not feel his/her neck stiff or hurt after waking up.

The auxiliary inflatable belt device of the present invention can be used to cooperate with a safety belt originally provided in the transportation to secure and cushion the user. If a traffic accident happens, the present invention also protects the user.

The present invention further provides an auxiliary supporting belt device, which includes a supporting belt body and a fixing device. The difference between the supporting belt body and the inflatable belt body lies in that: filler such as foam or memory foam can be filled in the supporting belt body instead of air. Thus, the inflating device can be omitted. The fixing device is also connected to the supporting belt body. The auxiliary supporting belt device allows the body and head of the user to rest thereon and supports the person who sleeps on the seat.

The above-mentioned descriptions represent merely the preferred embodiments of the present invention, without any intention to limit the scope of the present invention thereto. Various equivalent changes, alternations or modifications based on the claims of present invention are all consequently viewed as being embraced by the scope of the present invention.

What is claimed is:

1. An auxiliary inflatable belt device provided on a seat of a vehicle, comprising:
    a base unit disposed on the seat;
    an inflatable belt body having an integrated air chamber therein retractably disposed on the base unit and entirely receivable therein, wherein the inflatable belt body having at least one inflating port;
    an inflating device communicating with the inflating port of the inflatable belt body, the inflatable belt body forming a 3-dimensional body after being inflated; and
    a fixing mechanism disposed on the inflatable belt body for fixing the inflatable belt body to the interior of the vehicle.

2. The auxiliary inflatable belt device according to claim 1, wherein the auxiliary inflatable belt device is built in the seat.

3. The auxiliary inflatable belt device according to claim 2, wherein the inflatable belt body is provided in an accommodating space of the seat.

4. The auxiliary inflatable belt device according to claim 1, wherein it is detachably provided on the seat.

5. The auxiliary inflatable belt device according to claim 4, wherein the fixing mechanism is provided on the base unit, the base unit is detachably combined with the seat.

6. The auxiliary inflatable belt device according to claim 1, wherein the inflatable belt body is formed into a linear, curved or block-like shape.

7. The auxiliary inflatable belt device according to claim 1, wherein the auxiliary inflatable belt device are further provided with a plurality of inflatable belt bodies, and the plurality of inflatable belt bodies is assembled together or the plurality of inflatable belt bodies is separated individually.

8. The auxiliary inflatable belt device according to claim 1, wherein the inflating device is an automatic inflating device.

9. The auxiliary inflatable belt device according to claim 8, wherein the inflating device is an electric pump.

10. The auxiliary inflatable belt device according to claim 1, wherein the inflating device is a manual inflating device.

11. The auxiliary inflatable belt device according to claim 10, wherein the inflating device is an inflating ball.

12. The auxiliary inflatable belt device according to claim 1, wherein the amount of air within the inflatable belt body is adjustable.

13. The auxiliary inflatable belt device according to claim 1, wherein the fixing mechanism comprises a first fastener and a second fastener, the first fastener is fixed to one end of the inflatable belt body, the second fastener is fixed to one side of the seat, the first fastener and the second fastener are connected with each other selectively.

14. The auxiliary inflatable belt device according to claim 13, wherein the first fastener is a male fastener, the second fastener is a female fastener, the second fastener is provided with a release button.

15. The auxiliary inflatable belt device according to claim 1, wherein the inflating device and the inflating port of the inflatable belt body are connected with each other via a connecting pipe.

* * * * *